March 24, 1970     C. POLESCHOOK     3,502,366
TRAILER DEVICE

Filed Sept. 25, 1967     2 Sheets-Sheet 1

INVENTOR
Carl Poleschook

BY Robert E. Klene
ATTORNEY

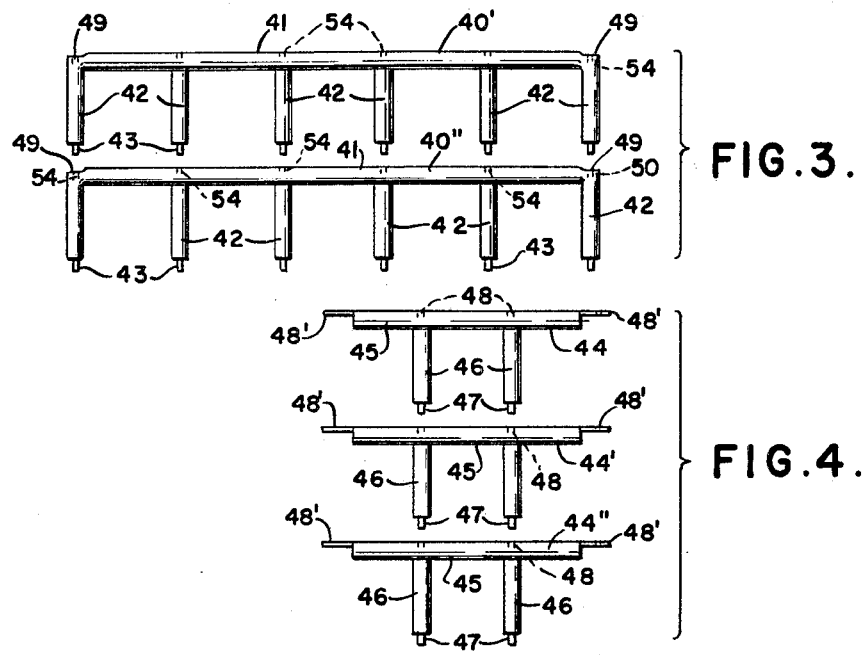
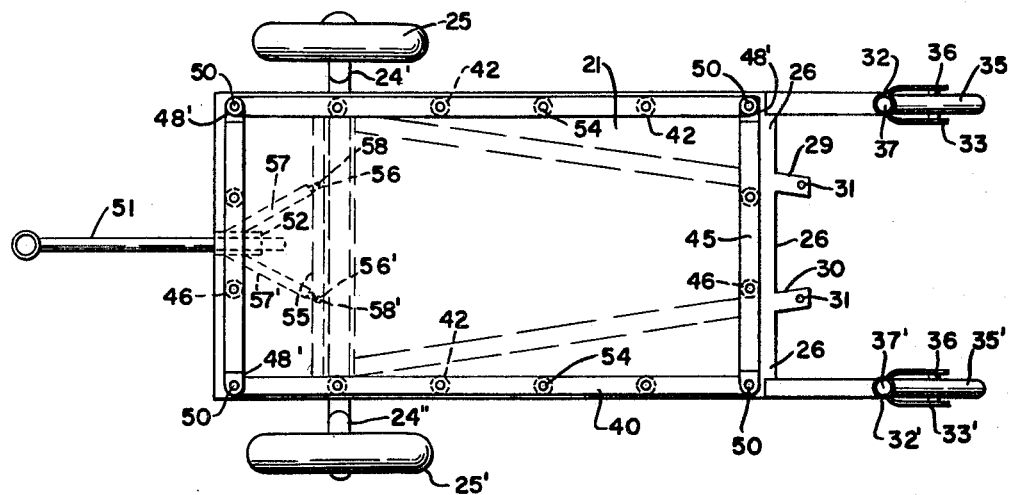

United States Patent Office 3,502,366
Patented Mar. 24, 1970

3,502,366
TRAILER DEVICE
Carl Poleschook, Max, N. Dak. 58759
Filed Sept. 25, 1967, Ser. No. 670,208
Int. Cl. B60p 3/00
U.S. Cl. 296—8      1 Claim

ABSTRACT OF THE DISCLOSURE

The invention comprises a farm trailer having a rectangular platform having a plurality of upright type frames forming walls along the sides of the platform. The upright type frames being stacked one above the other to form vertical walls with hollow vertical end pipes at their outer ends. Pegs connecting the pipes together. Caster wheels mounted to the forward end of the platform and a pair of wheels mounted to the rear of the platform.

---

This invention relates to farm trailer equipment, more particularly the invention relates to farm hauling equipment for hauling straw and the like.

It is an object of the invention to provide a novel platform for hauling farm commodities such as straw having detachable sides and which may be assembled to various different heights.

It is a further object of the invention to provide a novel trailer for hauling straw which has detachable sides, and a detachable hitch for the trailer whereby the trailer may be towed from either direction.

It is a further object of the invention to provide a novel farm trailer which can be easily manufactured and used for a variety of purposes.

Further objects and advantages of the invention will become apparent as the description proceeds and when taken in conjunction with the accompanying drawing wherein:

FIGURE 3 is a side-elevational view of two of the side frames of the trailer invention, showing the side frames detached from one another.

FIGURE 4 is a end-elevational view of three of the end frames of the trailer invention, showing the end frames detached from each other.

FIGURE 5 is a top-plan view of the farm trailer invention.

Briefly stated, the invention comprises a farm trailer having a rectangular platform and having a plurality of pipe-like side frames stacked one above the other with the side frames having vertical pipes with pegs at the lower ends and the side frames having bores along the top for receiving the pegs whereby the side frames may be stacked one above the other to form side frames for the platform of a selected height, a plurality of pipe-like end frames stacked one above the other with the end frames each having vertical pipes with pegs at their lower ends and the end frames having bores at their upper ends for receiving the pegs for stacking the end frames one above the other to form end frames for the platform of a selected height.

Figure 1:
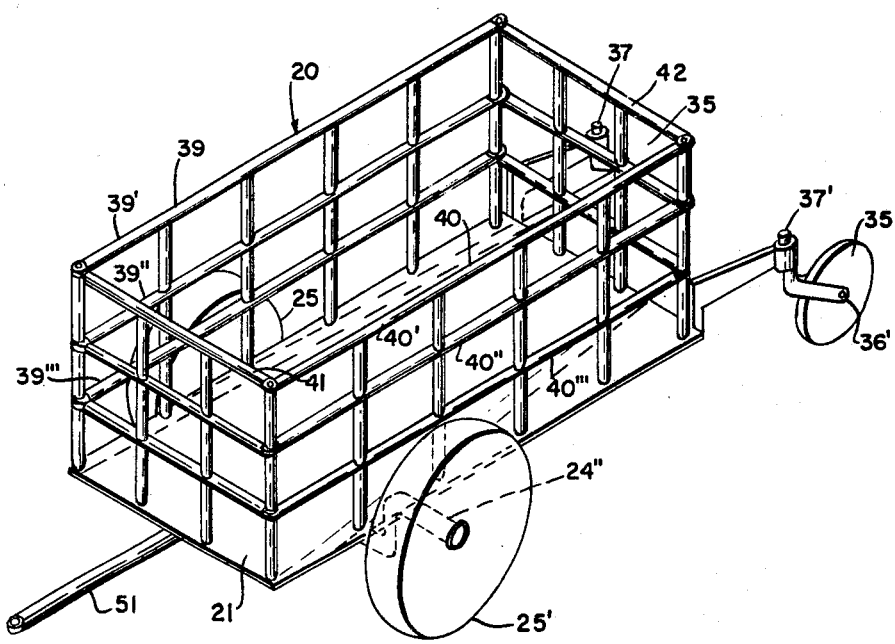
FIGURE 1 is a perspective view of the farm trailer invention.

Referring more particularly to the drawings, in FIGURE 1, farm trailer invention 20 is illustrated having a rectangular platform 21, with a pair of beams 22 and 23 running laterally beneath the platform 21 and fixed thereto. A pipe 24 is also fixed to the platform between the beams 22 and 23 and each end 24' and 24" is offset upward from the central portion 24''' of the pipe 24. Wheels 25 and 25' are rotatably mounted to the offset ends 24' and 24" of the pipe 24.

A rectangular elongated beam 26 extends laterally across the one end 27 of the platform and is fixed thereto. A pair of converging leg members 29 and 30 converge rearwardly toward one another and outward from the beam 26 having a pair of bores 31.

A pair of sleeve 32 and 32' are fixed to the beam 26. A pair of forked members 33 and 33' each have a pair of legs 34 and 34' with caster wheels 35 and 35' rotatably mounted between the legs 34 and 34' by a pin 36. The forked members 33 and 33' each have a vertical shaft 37 and 37' which are rotatably mounted in sleeves 32 and 32' respectively to pivot the wheels about a vertical axis.

Platform 21 has a plurality of bores 38 along its edge for receiving the side frames 39 and 40 and end frames 41 and 42.

Figure 2:
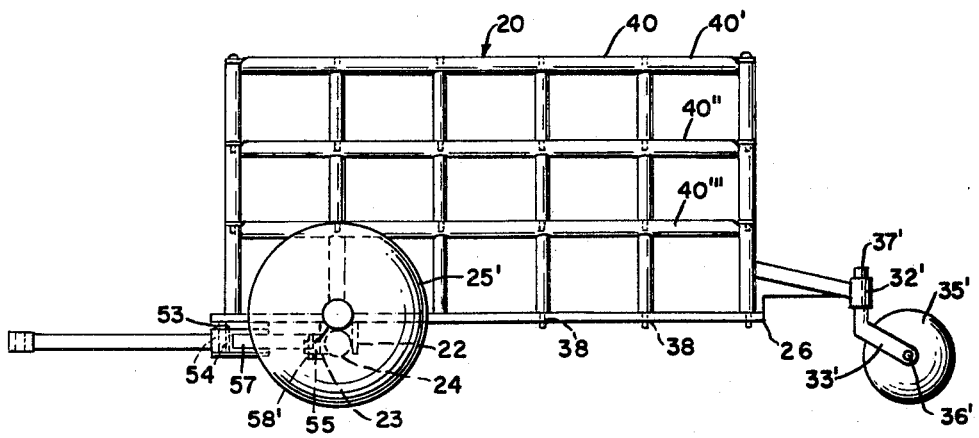
FIGURE 2 is a side-elevational view of the farm trailer invention.

The side frames 39 and 40 shown in FIGURES 1 and 2 each have three separate sections 39', 39" and 39''' and 40', 40" and 40''' respectively.

Each section 39'–40''' has a horizontal tube portion 41 and lateral short leg portion 42, with pins 43 projecting from the bottom of the legs 42. The pins 43 project in holes or bore 64 in the tops of the horizontal tube portion 41, for stacking the sections 39–39''' and 40'–40''' as shown in FIGURES 1 and 2.

The end frames 41 and 42 each have three pipe sections 44, 44' and 44", each pipe section 44, 44' and 44" has a horizontal pipe portion 45 and a plurality of vertical leg portions 46, with pins 47 fixed to the lower ends of each leg section. The horizontal pipe portions 45 each have bores 48 along their tops and receive the pins 47 of the adjacent pipe section to stack the pipe sections 44, 44' and 44" in vertical relation.

The ends of the end pipe portion 45 of the end frames have flattened eyelets 48' and the end pins 43" of the side frames project through the eyelets 48 and into the bores 44 of the side frames to lock the side frames and end frames together.

The horizontal tube portion 41 of the side frame sections 39'–39''' and 40'–40''' each have a stepped down portion 49 so that the eyelets 48' may fit between the short legs 42 at each end of the side frames with the pins 48 locking the legs 42 and eyelets 48 together.

Four separate pins 50 having enlarged heads are inserted in the eyelet 48' of the top end frame sections 44 and pass through the eyelet into the short legs 42 of the side frames to lock the side and end frame together.

It will be obvious that any desired number of end frame sections and side frame sections may be used to raise the trailer frame to any desired height.

The trailer invention has a towing bar 51 fitted into a sleeve 52. The towing bar has a plurality of bores 54 therein so that a pin 53 may be inserted in the sleeve 52 and into one of the bores 54, when adjusting the towing bar to different lengths.

The trailer frame has a horizontal bar portion 55 fixed to the one beam with a pair of eyelets 56 and 56'. The sleeve 52 has diverging flanges 57 and 57' with hooks 58 and 58' at their outer ends for hooking into the eyelets 56 and 56' to lock the towing bar to one end of the trailer.

Also the hooks 58 and 58' may be hooked into the bores 31 of the converging legs 29 and 30 at the opposite end of the trailer when towing the trailer from the opposite direction.

It will be obvious that various changes and departures may be made in the invention without departing from the spirit and scope thereof and accordingly it is not intended that the invention be limited to that specifically described in the specification or as illustrated in the drawings but only as set forth in the appended claim.

What is claimed is:
1. A farm trailer comprising a rectangular platform, plurality of upright pipe frames forming walls along the sides of said platform, said pipe frames being stacked one above the other to form vertical walls, said pipe frames having hollow vertical end pipes at their outer ends, with pegs at the lower ends of said pipes to be received in the hollow upper ends of the pipes of next pipe frames therebeneath, said pipe frames each having a horizontal pipe connecting said end pipes together, said horizontal pipes each having a plurality of holes, a plurality of intermediate upright pipes fixed at intervals said horizontal pipe and extending downward therefrom, said intermediate pipes having pegs at their lower ends projecting into the holes in the horizontal pipes of the next pipe frame therebeneath, to secure the pipe frames together, a front and back pipe frame having projecting eyelets at the upper outer ends projecting over the upper hollow ends of said end pipes of said vertical pipes, pins passing through said eyelets and into said end pipes of the uppermost pipe frame to lock the front and back pipe frames to the pipe frames forming the sides, said platform having projecting arms at its forward end, a pair of caster wheels mounted to the front end of said platform rotatably mounted to the outer ends of said arms and adapted to rotate about a vertical and horizontal axis, a tow bar having a pair of pins at its inner ends, said platform having a pair of holes at its front and rear ends for mounting said tow bar at either end of said platform, a pair of wheels mounted to the rear end of said platform.

References Cited

UNITED STATES PATENTS

| | | | |
|---|---|---|---|
| 1,097,163 | 5/1914 | Brown | 296—3 X |
| 2,879,552 | 3/1959 | Torrance | 52—637 |
| 2,311,988 | 2/1943 | Lavin | 52—637 |

PHILIP GOODMAN, Primary Examiner

U.S. Cl. X.R.

52—637